March 3, 1959 W. B. HERNDON 2,875,699
VARIABLE CAPACITY PRESSURE SYSTEM FOR TRANSMISSIONS
Original Filed Jan. 24, 1950 4 Sheets-Sheet 1

Inventor
Walter B. Herndon
Willits, Helmig & Baillie
Attorneys

March 3, 1959 W. B. HERNDON 2,875,699
VARIABLE CAPACITY PRESSURE SYSTEM FOR TRANSMISSIONS
Original Filed Jan. 24, 1950 4 Sheets-Sheet 2
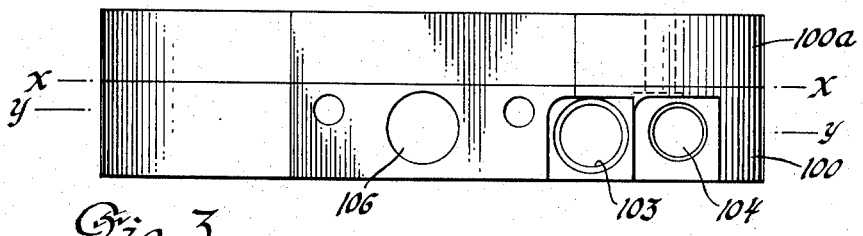
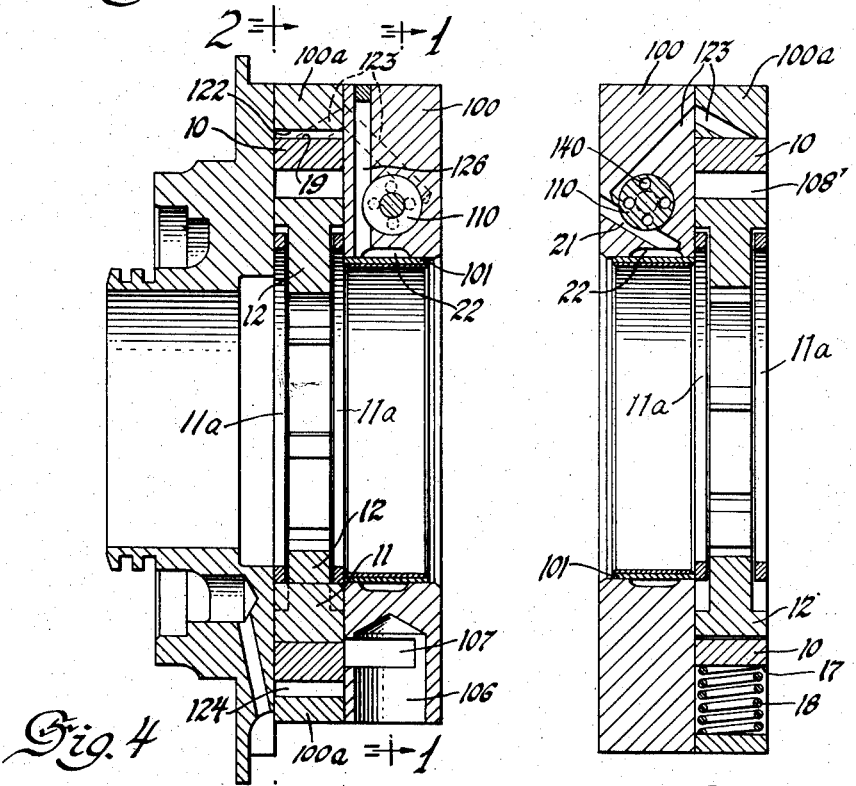
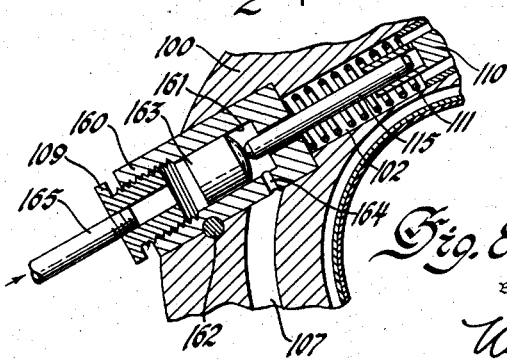
Inventor
Walter B. Herndon
By
Willits, Helmig & Baillio
Attorneys March 3, 1959 W. B. HERNDON 2,875,699
VARIABLE CAPACITY PRESSURE SYSTEM FOR TRANSMISSIONS
Original Filed Jan. 24, 1950 4 Sheets-Sheet 3

Inventor
Walter B. Herndon
By
Willits, Helmig & Baillio
Attorneys

March 3, 1959                    W. B. HERNDON                    2,875,699
              VARIABLE CAPACITY PRESSURE SYSTEM FOR TRANSMISSIONS
Original Filed Jan. 24, 1950                              4 Sheets-Sheet 4

INVENTOR.
Walter B. Herndon
BY
T. L. Chisholm
ATTORNEY

United States Patent Office 2,875,699
Patented Mar. 3, 1959

2,875,699

VARIABLE CAPACITY PRESSURE SYSTEM FOR TRANSMISSIONS

Walter B. Herndon, Ann Arbor, Mich., assignor to General Motors Corporation, Detroit, Mich., a corporation of Delaware Continuation of application Serial No. 140,176, January 24, 1950. This application July 19, 1954, Serial No. 444,119

13 Claims. (Cl. 103—120)

This application is a continuation of my co-pending application Serial No. 140,176, filed January 24, 1950, entitled Variable Capacity Pressure System for Transmissions, now abandoned.

The invention relates to a pump which can be adjusted to vary its volumetric capacity, so that the pump can supply liquid at a substantially constant pressure, if desired, over a wide range of rates of flow, and the pressure at which the flow is maintained can be readily changed whenever desired.

One example of pumps to which my invention is applicable, has a rotary impeller provided with radially slidable vanes, which rotate within a ring confining the vanes. The ring can be placed eccentric to the impeller and the eccentricity can be varied to change the capacity of the pump, which means the volume of liquid which the pump can deliver on each revolution. Sometimes this is referred to as changing the stroke of the pump.

The invention has for one of its objects to provide an improved method of and means for controlling the capacity of variable capacity pumps, and in particular to provide one control means which automatically maintains a constant pressure at varying volumetric output, varying the capacity of the pump in accord with pressure delivered, and another control which changes the response of the automatic control so as to maintain a different pressure or a different range of pressures. The second control may be operated manually, or it may be made automatic in response to the varying volume and pressure required by some machine such as an automatic transmission for automobiles.

Such pumps can be used, as hereinafter shown by way of example for controlling and operating the elements of a speed-ratio changing transmission mechanism having speed ratio determining members operative by fluid pressure.

A pump according to the invention is sufficiently flexible in operation to meet a wide range of operating speeds and conditions, and is promptly responsive to changes in the demand for fluid at substantially constant operating pressures for servo systems.

In the example of the invention hereinafter particularly described there is an eccentric type pump in which the stroke or capacity is varied by a slidable guide member which is variably positioned by pressures determined by a regulator valve so as to tend respectively to shift the member toward a full stroke or maximum eccentric position, and to shift the member toward a minimum stroke position. The regulator valve is loaded by a spring which determines the pressures at which these actions take place with reference to the existing pump pressure.

A further feature is a second valve for controlling the pressure feed to an auxiliary unit at a value lower than that determined by the regulator valve.

Still another feature of the invention is the provision of a pump having two fluid delivery outlets so arranged that one is always shut off until a predetermined pressure is maintained in the other, preferably using for the shut off device the slidable eccentricity member which controls the pump capacity.

The pump device can be controlled by an operator to vary the capacity of the pump and the effective pressure of the servo lines supplied by the pump.

One useful application of a pump according to the invention is to a power transmission mechanism of a motor vehicle, and is hereinafter so described.

The scope of the invention is defined by the appended claims; and how it can be carried into effect is hereinafter particularly described with reference to the accompanying drawings in which:

Figures 1 and 2 are transverse sections in different planes of a pump according to the invention; being sections on the lines 1—1 and 2—2, respectively, of Fig. 4, Fig. 1 being partly diagrammatic;

Figure 3 is a bottom plan of the pump, as seen from below Figures 1 and 2;

Figures 4 and 5 are sections on lines 4—4 and 5—5, respectively, of Figure 2;

Figure 8 is a section of an alternative form of the device shown in Figure 7.

Figure 1:
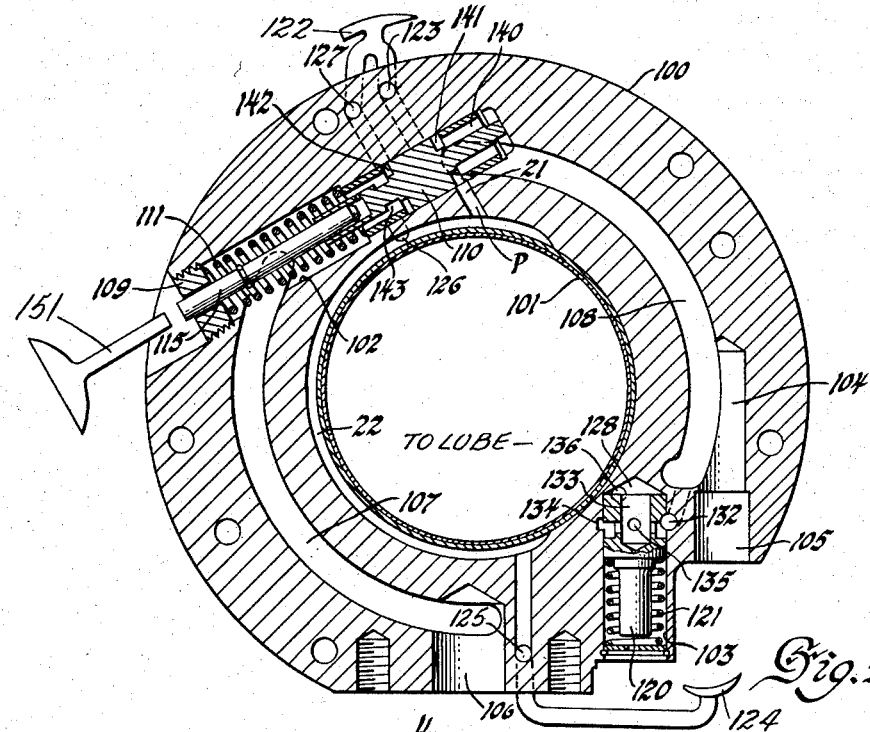
Figure 2:
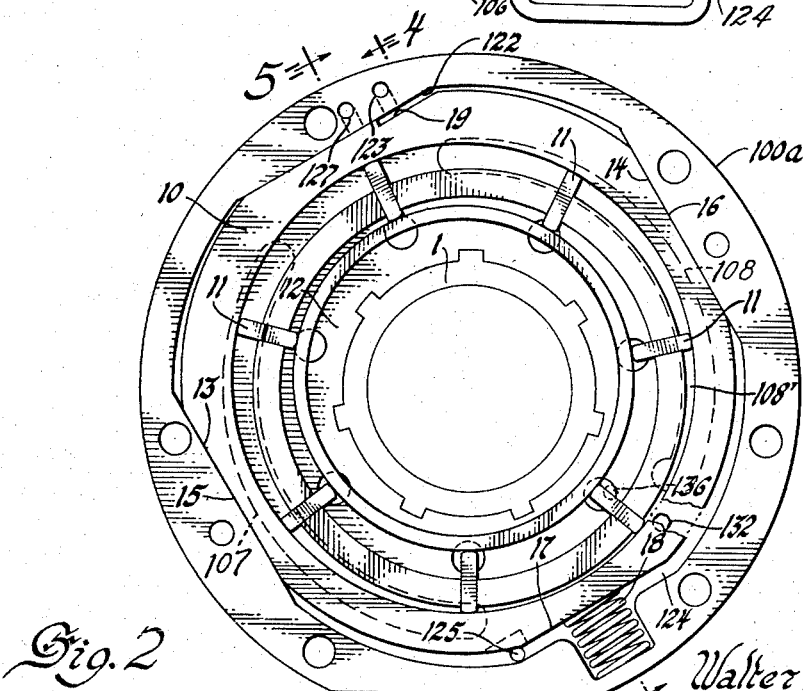

The pump devices shown in Figures 1 to 5 comprises a pump casing 100a and an adjacent valve casing 100, through which passes a shaft 1 (shown in Figures 2 and 6) carrying a rotor 12 having radially slidable blades 11 which are held by guide rings 11a so that they engage at their outer edges with the internal surface of a ring 10 which fits and is rectilinearly slidable within the casing 100a. The ring 10 has two flat guide surfaces 13 and 14 which engage and are adapted to slide relatively to internal flat surfaces 15 and 16, respectively, of casing 100a. The ring has another flat surface 17 engaged by a spring 18, which is located in a pocket in the casing 100a and which urges the ring 10 toward the top of the casing 100a as shown in Figure 2. The ring 10 can move along the guide surfaces 15, 16 from the position shown in Figure 2, against the force of the spring to another position where the surface 17 engages the adjacent inner surface of casing 100a. In this way the eccentricity of the internal surface of the ring 10, which forms the outer wall of the crescent-shaped pump chamber 103', can be varied relative to the shaft 1 and rotor 12; and in this way the capacity or effective stroke of the pump can be changed.

The variation of eccentricity, and hence the change of pump capacity, is effected by means of fluid pressure acting on the ring 10. On one side, acting against the spring 18 and therefore tending to shorten the stroke, fluid pressure can be applied in the arcuate space 122 (Figure 2) through passage 123 in a manner described below. This constitutes a pressure-responsive motor or servo for reducing the capacity of the pump. On the other side, acting with the spring 18 and therefore tending to lengthen the stroke, fluid pressure can be applied to the arcuate space 124 (Figure 2) through port 125 and passages 22 and 21 (Figure 1) in the valve casing 100, in a manner described below. This constitutes another pressure-responsive motor for increasing the capacity of the pump. The passage 22 is formed as a groove around a ring 101 in casing 100. Thus, while pressure is applied to one or both of the spaces 122 and 124, the effective pump stroke is determined by the resultant of the pressure or pressures and the spring 18.

Around the suction arc of movement of the vanes 11, the pump chamber 108' is open to the arcuate inlet passage 107 (Figure 1) to which fluid is fed from an inlet conduit or passage 106. Around the pressure arc of movement of the vanes 11, the pump chamber 108' is open to the arcuate outlet passage 108 which is connected by a passage 104 to the outlet conduit or passage 105. These passages and ports are formed in the valve casing 100, as shown in Figure 1, which, as shown in Figures 4 and 5, fits closely to the pump casing 100a such that the suction and pressure passages 107 and 108 are separated and the intervening spaces between the vanes 11 are sealed off at the sides. The positions of the passages 107 and 108 relative to the ring 10 and vanes 11 are indicated in dotted lines in Fig. 2.

The valve casing 100 has a bore 102 (Figure 1) which is open at one end to the inlet passage 107 and at the other end to the outlet passage 108, and which contains a valve 110 carrying at each end sleeves with communicating passages 140, 143 respectively and having intermediate annular grooves 141, 142 (see also Figures 4 and 5). A spring 111 constantly urges the valve toward the closed end of the bore 102 as shown in Figure 1. The valve carries a stem 115 which is slidable in an adjustable nut 109 by which the pressure of the spring 111 on the valve can be varied.

Adjacent the groove 141 is the end of the passage 21, so that in the position shown in Figure 1, fluid under pressure can be transmitted from the outlet passage or pressure space 108, through passages 140 and groove 141 to passage 21 and thence via passage 22 and port 125 to the arcuate space 124 as already described. Such a transmitted pressure, as already indicated, tends to lengthen the effective pump stroke.

Adjacent the enlarged portion of valve 110, and cut off thereby in the position shown in Figure 1, but shown in Fig. 5 is one end of a passage 123 which as already indicated is adapted to transmit fluid under pressure to the arcuate space 122 for shortening the effective pump stroke. The passage 123 is formed jointly in the two casings 100 and 100a as shown in Figures 4 and 5.

Adjacent the groove 142, in the position of Figure 1, there is passage 127 which can exhaust stroke-reducing space 122. The sleeve containing the passages 143 closes off, in the position shown, an exhaust passage 126 communicating with the capacity increasing space 124 by way of arcuate passage 22 leading from pressure passage 21 to port 125, and opens passage 127 to the pump inlet.

The speed of the shaft 1 and the volume of the pump chamber 108' and the other factors are related to the dimensions of the valve 110 and the characteristics of spring 111 so that the pump capacity is automatically varied to maintain a substantially constant pressure of say between 85 and 90 pounds per square inch. Thus the pump stroke is regulated to a minimum to produce the required output pressure within the given range.

This is effected as follows. As the shaft 1, rotor 12, and vanes 11 rotate, fluid is drawn from inlet passage 107 and is carried over and passed into outlet passage 108 under pressure, and thence to the outlet port 104. Fluid passes from passage 108 through passages 140 in valve 110 to passages 21, 22 and port 125 into space 124. When filled, these various passages are subject to the same pressure as at the outlet 104, and thus the ring 10 is firmly held in the full-stroke position shown in Figure 2, by means of the spring 18 and the fluid pressure in space 124.

If the pressure rises above the selected value above 85 pounds per square inch for example, then the valve 110 is moved against its spring 111 until the left-hand edge of groove 141 passes the end of passage 123 to admit fluid under pressure to the capacity-reducing space 122, and the left-hand edge of groove 142 passes over the end of passage 126 to exhaust passage 22 and capacity-increasing space 124. During this time the right-hand edge of groove 141 begins to pass over the end of passage 21 to cut off pressure from passage 22. The result is that pressure on ring 10 in space 124 is diminished and in space 122 is increased: and ring 10 moves against its spring 18 to an extent depending on the degree of pressure above the required value. This shortens the effective stroke of the pump accordingly. If the pressure reaches and exceeds the range maximum, then passage 21 is closed off completely, passage 22 is completely exhausted and full pressure is applied through passage 123. The result is that ring 10 is seated against its spring 18, and the pump stroke is reduced to a minimum.

While these various passages are being thus closed and opened, groove 142 passes from the end of exhaust passage 127 to close it off.

With a subsequent drop in pressure the reverse motions take place and the effective stroke of the pump is increased according to the pressure drop. Thus there is a change of pump capacity according to the output pressure, which is kept within the required range.

Figure 6:
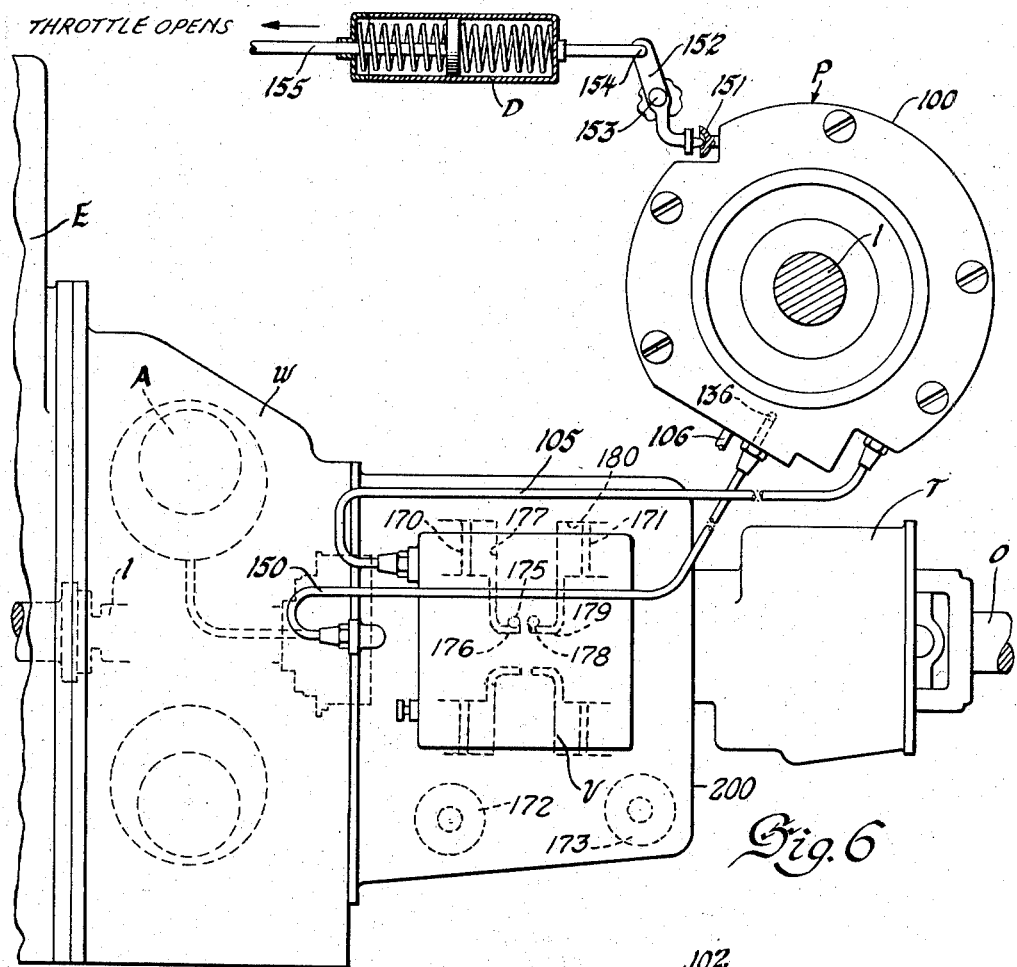
Figure 6 is a diagram of a motor vehicle transmission system incorporating a pump device according to the invention.

An auxiliary pressure feed of reduced value is obtained by means of a valve 120 (Figure 1) mounted in a bore 103 of the valve casing. The valve has a bore 133 open by ports 135 to a groove 134 in the casing, which is fed with oil under pressure from port 132. Bore 133 is open at one end to space 128 from which fluid passes through outlet 136 to a line 150 (Fig. 6). Pressure is admitted to port 132 directly from pump chamber 108' (Figure 2) at a position therein beyond the end of outlet passage 108, this connection being indicated diagrammatically in Fig. 1. Thus initially a reduced pressure is obtained. Port 132 is, however, open to the pump chamber 108' only after the ring 10 has moved a certain distance, say one third of its possible travel as indicated in Fig. 2. If the pressure above valve 120 in space 128 exceeds a certain value, say 30 pounds per square inch, then valve 120 is forced against its spring to close off groove 134. In this way the auxiliary pressure feed is kept within reduced limits.

One application of a pump device P as above described is shown diagrammatically in Figure 6, where there is indicated a motor vehicle transmission system consisting of an engine E driving a fluid coupling A which is contained within a casing W and is connected through a transmission T to the driven shaft O. A servo valve mechanism V controls the speed ratio of the gearing in box T in known manner. The pump shaft 1 can be connected at any convenient point to the drive.

The pump discharge conduit 105 is connected to the control mechanism V, and the auxiliary reduced pressure line 150 is connected between port 136 and the working space of the fluid coupling A so as to keep the latter filled with fluid at the desired pressure, say 30 pounds per square inch.

The outlet pressure of pump P for controlling the ratio through servo mechanism V can be varied in accordance with movements of the accelerator pedal (not shown) through a linkage consisting of rod 155, lost motion device D, rod 154, lever 152, pivoted on pin 153, and plunger 151 whose inner end is arranged to contact with the end of valve stem 115 (Figure 1).

The arrangement is such that movement of the accelerator pedal, or equivalent engine control, in the direction to increase the speed of the engine, effects a leftward movement of rod 155 as shown by the arrow and a consequent rightward movement of plunger 151 which increases the pressure maintained by the pump, for example by moving valve 110 to the right as Fig. 1 is viewed. The operation of control mechanism V may, for example, be dependent on two factors: engine speed and accelerator pedal position.

The pump pressure may be utilized to operate clutches or brakes or both in an epicyclic gearing unit; and the operative pressure may be varied in accordance with accelerator pedal position so that it increases with torque demand.

The increase of pressure effected by the throttle may be accomplished in several ways.

Figure 7:
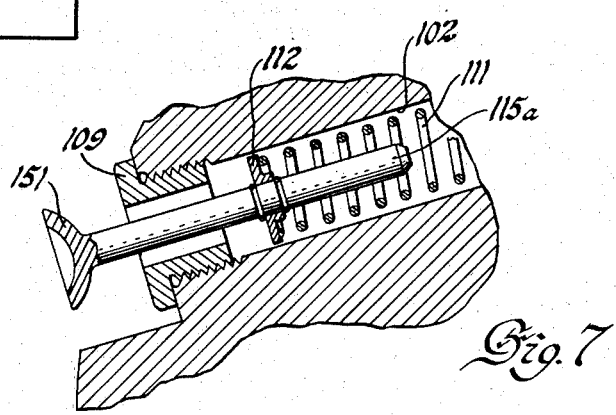
Figure 7 is a detail, in section, of part of Figure 6.
Figure 9:
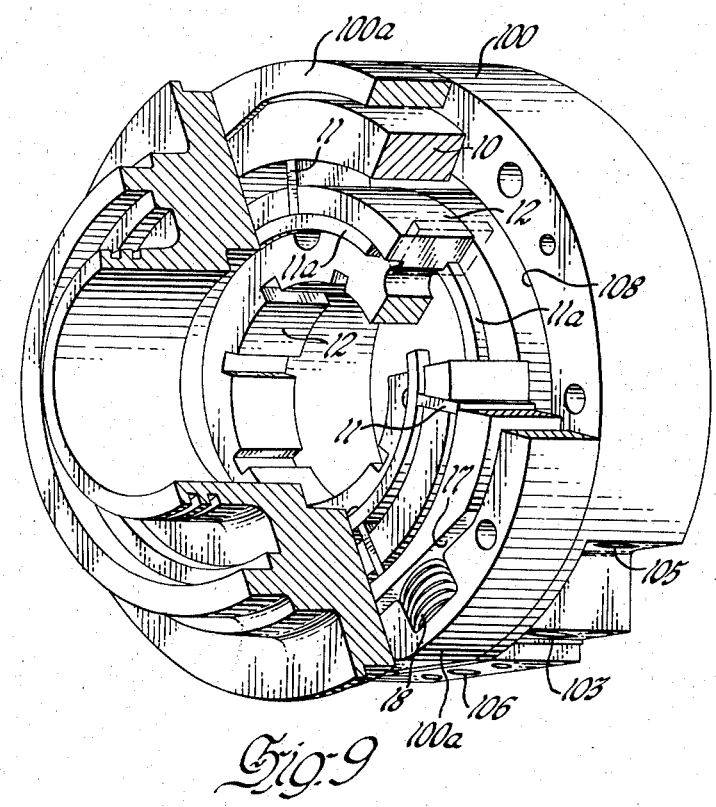
Figure 9 is a cut-away perspective view of a pump shown in Figures 1–5.

The link 155 may be arranged to operate directly on the valve stem 115 of Fig. 1 if desired as in Fig. 6. Alternatively it can be connected through plunger 151 in the manner shown in Figure 7 where the stem 115a carries a collar 112 against which the end of spring 111 abuts. The spring 111 is contained within the bore 102, as in Fig. 1 but closed by plug 109. Thus the influence of the accelerator pedal is made effective through the spring 111 instead of directly on the valve stem 115.

A fluid pressure modifying control of valve 110 is shown in Figure 8 where a cylinder 160 held in casing 100 by peg 162 and having a plug 109 and a bore 161 open through port 164 to passage 107, contains a floating piston 163. The piston is subject to fluid pressure from line 165 (which may be determined by accelerator pedal position, for example as shown in the U. S. Patent to Thompson 2,193,305) and is adapted to contact with the end of valve stem 115. Alternatively it could be arranged to contact with a collar similar to collar 112 in Figure 7, and thus the pressure would be applied through valve spring 111.

I claim:

1. In a variable pressure pumping system, the combination of a pump of variable stroke type having oppositely acting pump stroke varying mechanism and having fluid pressure actuated elements adapted to change the stroke of said mechanism, one of said elements consisting of a slidable stroke-changing ring, a pump delivery space and a suction inlet chamber, a pressure delivery passage leading from said pump delivery space, a control valve for said mechanism connected to said space and arranged to deliver pressure fluid therefrom alternately to said elements, a pressure-responsive surface on said valve, a calibrating spring arranged to apply force to said valve in opposition to the pressure acting on said face for causing automatic actuation of said elements, and a control member operative to move the said valve independently of said automatic action, effective to regulate the action of said valve independently thereof.

2. In combination, a power shaft rotatable at varying speeds, a variable capacity pump driven by the shaft and embodying a shiftable member operative to vary the capacity of the pump between maximum and minimum capacity positions, inlet and delivery passages for said pump, fluid pressure passages arranged to apply variable fluid pressures to said member for positioning the member between said positions, a valve adapted to control the application of fluid from said pump to said member-positioning passages, said valve having a calibrating spring and a pressure-exposed surface arranged to respond under variable delivered pump pressure acting to move the valve against the force of said spring, and control mechanism operable to urge the valve against the pressure force acting upon said surface and operative to change the pressure of said pump required to position the valve to increase the capacity of the pump.

3. The combination set forth in claim 2, in which said control mechanism has a valve-operating connection to shift said valve toward increasing stroke-determining positions, and includes a fluid pressure valve actuator for said connection effective to so move said valve under fluid pressure applied to said valve actuator.

4. The combination set forth in claim 2, in which are further included elements of said control mechanism for independent operation of said regulator valve apart from its response to the fluid pressure applied to said pressure-exposed surface and to the force of the said spring, said mechanism having one thrust element arranged to apply a variable force to the said valve, and a fluid pressure actuator effective to move said thrust element for applying said variable force.

5. The combination set forth in claim 2, in which said control mechanism includes a thrust-transmitting element for moving said valve independently of motion applied thereto by the fluid pressure acting on said surface and by said spring, and includes a fluid-pressure actuator for applying a thrust force to said thrust-transmitting element.

6. The combination set forth in claim 2, in which said control mechanism includes a thrust-transmitting element for applying a variable force to said valve actuating against the force applied thereto by delivered fluid pressure applied to said pressure-exposed surface of the valve.

7. The combination set forth in claim 2, in which said control mechanism includes a thrust-transmitting element for applying a variable force to said spring acting against the fluid pressure force applied to said pressure-exposed surface.

8. The combination set forth in claim 2, in which said control mechanism includes a member arranged to operate a thrust element disposed so as to apply a positioning force to said valve, said member being enclosed in a portion of a sleeve connected to a source of variable fluid pressure supplied by said pump.

9. A variable capacity fluid pressure pump comprising in combination a rotatable impeller, a ring surrounding the impeller to provide a pumping space therewith, the ring being movable with respect to the center of rotation of the impeller to vary the volumetric capacity of the pump, a fluid outlet for the pump, a first fluid pressure motor for moving the ring to increase the capacity of the pump, a second fluid pressure motor for moving the ring to decrease the capacity of the pump, a valve urged by the pressure of fluid in the outlet toward a first position in which the valve admits fluid from the outlet to the second motor, means yieldably urging the valve against outlet pressure and toward a second position in which the valve admits fluid from the outlet to the first motor, the valve being adapted to deliver fluid under pressure from the delivery space selectively to said motors in response to its position under the joint influence of pressure in the outlet and said urging means and a manually operable control member for urging the valve against the outlet pressure and toward the second position.

10. A variable capacity fluid pressure pump comprising in combination a rotatable impeller, a ring surrounding the impeller to provide a pumping space therewith, the ring being movable with respect to the center of rotation of the impeller to vary the capacity of the pump, a fluid outlet for the pump, a first fluid pressure motor for moving the ring to increase the capacity of the pump, a second fluid pressure motor for moving the ring to decrease the capacity of the pump, a valve urged by the pressure of fluid in the outlet toward a first position in which the valve admits fluid from the outlet to the second motor, means yieldably urging the valve against outlet pressure and toward a second position in which the valve admits fluid from the outlet to the first motor, the valve being adapted to deliver fluid under pressure from the outlet selectively to said motors in response to its position under the joint influence of pressure in the outlet and said urging means and a control member which urges the valve in said opposite direction independently of said yieldable urging means.

11. In combination in means for controlling a variable displacement pump wherein a modulator in a chamber is adjustable in the chamber relative to a pump rotor to vary pump displacement responsive to pump-created pressure directed through passages from the pump to the modulator chamber, a housing structure having a valve chamber therein including means for communication with said passages, a reciprocable valve body in said valve chamber adapted to be responsive to pump pressure to move in one direction, and means for biasing the valve body in the opposite direction in opposition to pump pressure including a biasing spring and a pressure-responsive auxiliary plunger operatively movable relative to the spring and active selectively in supplement to the spring to bias the valve body in said opposite direction.

12. In combination in control means for a variable displacement pump assembly of the kind including a pressure sensitive modulator the position of which must be controlled, a pressure-responsive control valve arranged to be exposed at one end to pump pressure, means at the opposite end of the valve plunger for biasing the plunger in opposition to the pump pressure comprising a coil spring, a projection from said opposite end of the valve plunger extending into the coil spring, and means including an auxiliary valve biasing plunger operable upon said projection to supplement the spring bias.

13. In combination in control means for a variable displacement pump wherein a casing has a reciprocable modulator providing a pump chamber and a pump rotor operates in the chamber with said modulator and said casing being related at the opposite ends of the modulator to define pressure chamber spaces while inlet and outlet ports in the casing respectively communicate in operative relation with said pump chamber and respective fluid passageways provided by the casing communicate with said control chamber spaces, a plunger valve housing defining a valve chamber having respective ports for communication with said passageways, a plunger valve in said housing for selectively controlling fluid flow through said ports and thereby through the respective passageways, means at one end of the valve normally biasing the valve in one direction, said housing having a passage communicating with the outlet port of the pump to subject the opposite end of said plunger valve to high pressure from the pump in opposition to said biasing means for modifying the position of the valve and to supply said passageways through said ports as selected by the valve with high pressure fluid from the pump, said biasing means including a biasing plunger normally free floating and reciprocably movable with respect to said one end of the plunger valve, and means for driving said biasing plunger toward the plunger valve with predetermined force.

References Cited in the file of this patent
UNITED STATES PATENTS

| | | |
|---|---|---|
| 1,943,929 | Rayburn | Jan. 16, 1934 |
| 2,170,856 | Dunn et al. | Aug. 29, 1939 |
| 2,170,869 | Neracher et al. | Aug. 29, 1939 |
| 2,205,470 | Dunn et al. | June 25, 1940 |
| 2,212,740 | Iavelli | Aug. 27, 1940 |
| 2,343,955 | Cotterman | Mar. 14, 1944 |
| 2,374,303 | Osborne | Apr. 24, 1945 |
| 2,577,413 | Frailing | Dec. 4, 1951 |
| 2,600,632 | French | June 17, 1952 |
| 2,600,633 | French | June 17, 1952 |
| 2,635,551 | De Lancey | Apr. 21, 1953 |
| 2,649,739 | Hufferd et al. | Aug. 25, 1953 |
| 2,651,994 | De Lancey et al. | Sept. 15, 1953 |
| 2,678,607 | Hufferd et al. | May 18, 1954 |

UNITED STATES PATENT OFFICE

CERTIFICATE OF CORRECTION

Patent No. 2,875,699                                March 3, 1959

Walter B. Herndon

It is hereby certified that error appears in the printed specification of the above numbered patent requiring correction and that the said Letters Patent should read as corrected below.

Column 6, line 9, for "actuating" read -- acting --.

Signed and sealed this 30th day of June 1959.

(SEAL)
Attest:

KARL H. AXLINE
Attesting Officer

ROBERT C. WATSON
Commissioner of Patents